431-31
Search R
Nov. 18, 1941. B. VALJEAN Re. 21,950
CONTROL FOR COMBUSTION APPARATUS Orig. 2,214,912
Original Filed Nov. 6, 1937
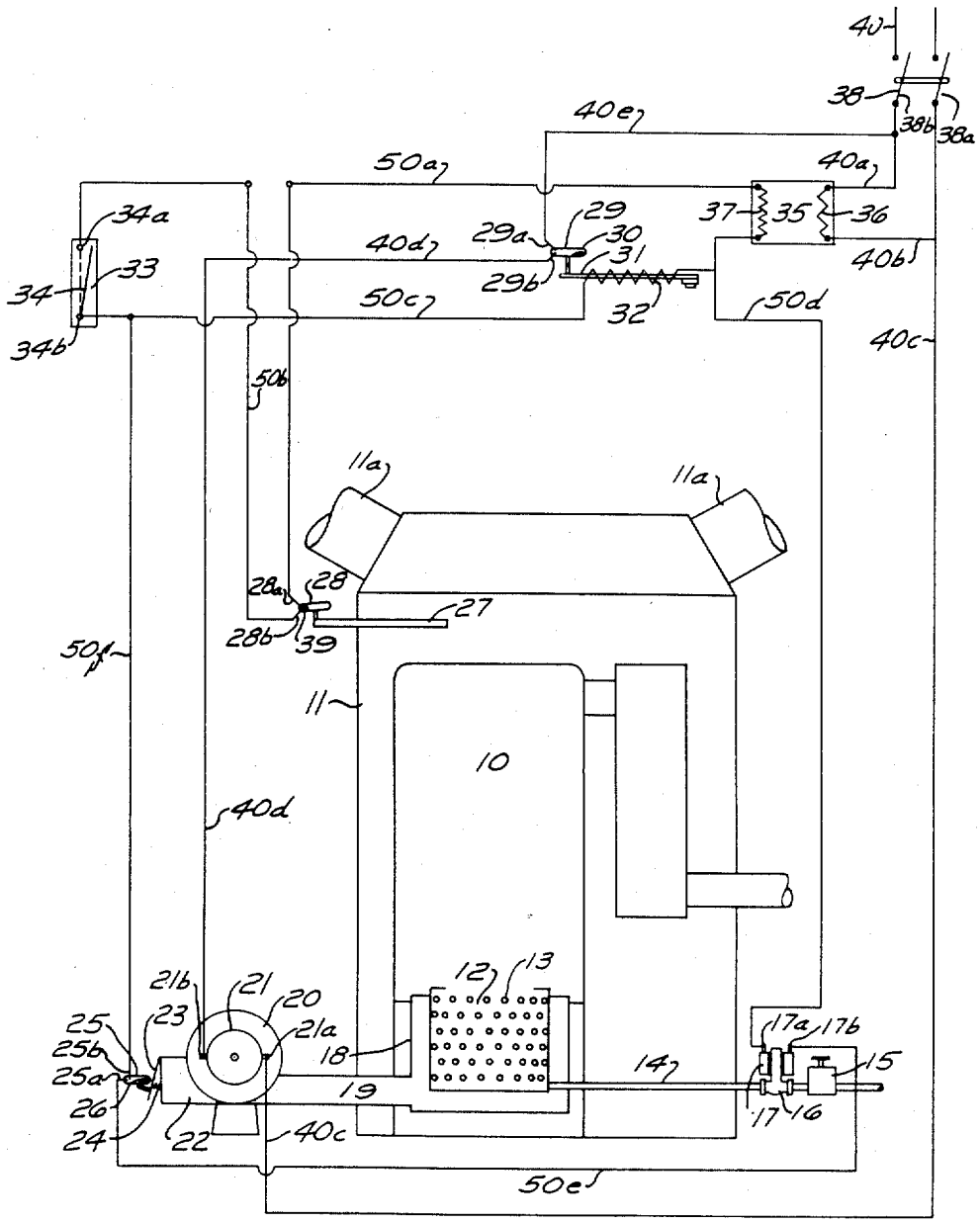
INVENTOR.
BEN VALJEAN
BY
Carroll R. Taber
ATTORNEY.

58. LIQUID & GAS
FUEL BURNERS

Reissued Nov. 18, 1941

Re. 21,950

UNITED STATES PATENT OFFICE 21,950

CONTROL FOR COMBUSTION APPARATUS

Ben Valjean, Okemos, Mich., assignor to Motor Wheel Corporation, Lansing, Mich., a corporation of Michigan Original No. 2,214,912, dated September 17, 1940, Serial No. 173,098, November 6, 1937. Application for reissue September 16, 1941, Serial No. 411,058

4 Claims. (Cl. 158—28)

This invention relates to controls for combustion apparatus, and more particularly to combustion apparatus of the type which is adapted to burn liquid fuel.

An object of the invention is to provide a system of controls for liquid fuel burners whereby fuel will never be supplied to the burner unless the fan that supplies air for combustion is in operation.

Another object of the invention is to provide a system of controls for a liquid fuel burner such that when the supply of fuel is automatically cut off the fan will continue to run for a short length of time to completely consume the fuel remaining in the burner.

A still further object of the invention is to provide a novel control for interrupting the flow of fuel to the burner.

These and other objects ancillary thereto will become more apparent in the following specification wherein like reference numerals designate corresponding parts in the several views.

In the drawing the figure is a diagrammatic view of a hot air furnace and the controls therefor with the electrical circuit for operating same.

Referring now more particularly to the drawing, the numeral 10 designates a combustion chamber for a conventional hot air furnace. The combustion chamber 10 is surrounded by a casing 11 of sheet iron or sheet steel which is provided with the usual outlet ducts 11a which convey heated air to the various rooms of the building to be heated.

In the lower portion of the combustion chamber 10 is a conventional vaporizing pot type oil burner 12. The oil burner 12 is provided with a plurality of openings 13 through which air is supplied to the burner for combustion of the fuel therein.

A pipe 14 is connected at one end to the burner 12 and at the other end to a source of liquid fuel, not shown. A control 15, which may be either manually or automatically operated, is inserted in the pipe 14 in order to vary the rate of flow of fuel oil to the burner. In addition to the control 15, a valve 16 is also placed in the pipe line 14 to interrupt the flow of fuel when desired. The valve 16 may be of any conventional type, but it is preferred to use a gate type valve. The valve gate is raised by means of a solenoid 17 which is energized by an electrical current flowing in a circuit which will be described presently. It is lowered by gravity when the solenoid is deenergized.

An air jacket 18 surrounds the burner 12 and is connected by a duct 19 to a fan 20 that supplies air for combustion of the liquid fuel. The fan 20 is preferably of the centrifugal type, and is rotated by means of a motor 21 of any conventional type. The fan housing is provided with a duct 22 extending therefrom through which a certain amount of air may be drawn. The open end of the duct 22 is provided with a hinged plate 23 of substantially the same size as the open end of the duct 22, and is normally held in open position by the spring 24. The opening in the end of the duct 22 is not the air inlet opening for the fan, as plate 23 closes this opening when the fan is in operation. The inlet opening for the fan, through which air for combustion of the fuel is drawn, is located in the side wall of the housing opposite the motor as in any standard centrifugal fan.

Mounted on the hinged plate 23 is a mercury switch 25. This switch consists of a closed glass tube containing a globule of mercury 26 and two contact points 25a and 25b which are connected by the globule of mercury when the switch is closed. When the fan 20 is not running the switch is in open position. When the fan is in operation, the plate 23 is pulled to closed position by the suction induced by the fan, tilting the glass tube, whereby the globule of mercury 26 makes contact with the contact points 25a and 25b, and closes the switch 25.

Extending into the interior of the casing 11 of the furnace is a bi-metallic strip 27 which is adapted to respond to heat developed in the combustion chamber 10. At the outer end of the strip 27 is a conventional mercury switch 28 of the same type as the switch 25 described above. The strip 27 is of the usual type, namely, two parallel strips of metals of different coefficients of expansion whereby changes in temperature of the strip will cause it to bend and tilt the glass tube of the mercury switch 28. The switch 28 is adjusted so that it is normally closed, but opens if the combustion chamber 10 becomes overheated.

A switch 29, which is also a standard type mercury switch, having a globule of mercury 30 and terminals 29a and 29b, is mounted on the end of a bi-metallic strip 31 fixed at one end to any suitable support. The strip 31 is composed of two pieces of metal of different coefficients of expansion so that it will bend when heat is applied thereto in the same manner as the strip 27. Wrapped about the strip 31 is a resistance heating coil 32 which is adapted to heat the strip 31 when current passes through said coil. The switch 29 is adjusted so that it is normally open, but closes when the strip 31 is heated by the coil 32.

A thermostat 33 of any conventional construction is located within the building to be heated by the furnace 10. The thermostat has incorporated therein a switch 34 which is adapted to be opened and closed upon predetermined changes in temperature of the air within the room. The two terminals of the switch 34 are indicated diagrammatically at 34*a* and 34*b*.

A step down transformer 35 having a primary coil 36 and a secondary coil 37 is provided for furnishing current to actuate the solenoid 17. This transformer 35 is also of conventional construction.

A source of electrical current, preferably of the standard 110 volt house lighting current, is connected to the apparatus as shown in the wiring diagram of Figure 1. The current is brought in from the line 40 and passes through a double pole single throw switch 38. From one pole 38*a* of the switch a conductor 40*c* leads to one brush 21*a* of the motor 21 and the other pole 38*b* of the switch 38 is connected to terminal 29*a* of the mercury switch 29 by conductor 40*e*. The other terminal 29*b* of the switch 29 is connected by a wire 40*d* to the brush 21*b* of the motor.

The primary coil 36 of the transformer 35 is connected by the conductors 40*a* and 40*b* to the two poles of the switch 38. One end of the secondary coil 37 is connected by a conductor 50*d* to the terminal 17*a* of the solenoid 17. The other end of the secondary coil 37 is connected by a suitable conductor 50*a* to terminal 28*a* of the mercury switch 28, and the other terminal 28*b* of the switch 28 is connected to terminal 34*a* of the thermostat switch 34 by the conductor 50*b*. The other terminal 34*b* of the thermostat switch 34 is connected by a conductor 50*f* to one contact 25*b* of the mercury switch 25, and the other contact 25*a* of the switch 25 is connected by a conductor 50*e* to terminal 17*b* of the solenoid 17.

The heating coil 32 is connected at one end to one end of the secondary coil 37 of the transformer 35 and the other end of the heating coil 32 is connected by a wire 50*c* to the thermostat switch 34.

The operation of the control system is as follows: Assuming that the thermostat switch 34 which controls the temperature of the air in the room to be heated, is in open position, the entire apparatus will be inoperative and switches 25 and 29 will be open, switch 28 will be closed, and the gate valve 16 will also be closed. Now, if the temperature of the room drops to a predetermined value such that the thermostat switch 34 will close the circuit, a current induced in the secondary circuit 37 of the transformer 35 will flow through the conductors 50*a*, 50*b* and 50*c*, thereby heating the coil 32 by its resistance, and cause the strip 31 to bend. A short time after the thermostat switch 34 closes, usually about one minute, the strip 31 will bend far enough to displace the globule of mercury 30 in the switch 29 thereby closing the switch. Current will then flow through the conductors 40*c*, 40*d* and 40*e*, thus starting the motor 21 and the fan 20. The operation of the fan 20 will create a draft of air through duct 22 sufficient to cause the plate 23 to swing counter-clockwise about its pivot against the action of the spring 24, thereby tilting the switch 25 and closing the circuit of the solenoid 17. Current will then flow through the secondary coil 37 of the transformer 35 by means of conductors 50*a*, 50*b*, 50*f*, 50*e* and 50*d*. This will energize the solenoid 17 and raise the gate of the valve 16 whereby oil will flow into the bottom of the burner 12. It is, of course, understood that some means of ignition for the fuel oil in the burner is provided, preferably a pilot light or some means of producing an electric spark at the proper time. The fuel will ignite and heat combustion chamber 10, which in turn will heat the air in the building.

When the temperature of the room reaches the desired point the thermostat switch 34 opens, thereby breaking the circuit through the connections 50*a*, 50*b*, 50*f*, 50*e* and 50*d*, the solenoid 17 is de-energized and the gate valve 16 drops by gravity. This cuts off the flow of fuel to the burner, but as there is always a certain amount of fuel remaining in the burner when the valve 16 closes, it is desirable to completely consume it before the fan 20 is shut off. This is accomplished by reason of the fact that the heating coil 32 stays relatively hot for a certain length of time after the valve 16 closes. Consequently, the switch 29 will remain closed for a period of approximately two or three minutes during which time the fan continues to run and supply air for the complete combustion of the fuel remaining in the burner 12. After the coil 32 has cooled sufficiently, the switch 29 opens and the fan 20 ceases to run. The entire control system is then ready for another cycle when thermostat switch 34 again closes.

If, before the thermostat switch 34 opens due to increase in temperature of the air in the building, the combustion chamber 10 reaches a dangerous temperature, the safety switch 28 will be tilted by the bending of the bi-metallic strip 27, thereby moving the mercury globule 39 away from the terminals 28*a* and 28*b*. This will open the solenoid circuit, the solenoid will be de-energized and the valve 16 will close by gravity, interrupting the flow of fuel to the burner.

At the same time the current will be cut off from heating coil 32 so that the strip 31 may cool. The motor circuit will remain closed, however, until the switch 29 opens. The fan 20 will continue to run for a period of two or three minutes whereby a sufficient quantity of air to completely consume the fuel in the burner will be supplied.

Eventually the combustion chamber 10 and strip 27 will cool sufficiently to allow switch 28 to close. If the thermostat switch 34 is still closed, the apparatus will resume operation in the manner above described.

It will readily appear from the foregoing that this invention provides a system of controls that is absolutely safe in its operation because the oil cannot be supplied to the burner unless air in sufficient amount for complete consumption of the fuel oil is provided. In other words, the fan will always be in operation when fuel is admitted to the burner. Because of the safety switch 28 it is impossible to overheat the combustion chamber 10. Hence, the furnace cannot be damaged by excessive temperatures.

The scope of the invention is indicated by the appended claims.

I claim:

1. Combustion apparatus comprising a burner, means for supplying liquid fuel to the burner, a valve for controlling the fuel supply to the burner, a valve circuit comprising electrical means for actuating said valve and a switch in series therewith, a fan for supplying air to the burner, a 58. LIQUID [illegible]
FUEL BURNERS motor circuit comprising a motor for driving the fan and a switch in series therewith, means responsive to heat for closing the switch in the motor circuit, electrical heating means in shunt with the valve circuit for heating the last named means, and means actuated by air pressure induced by the fan for operating the switch in the valve circuit.

2. Combustion apparatus comprising a burner, means for supplying liquid fuel to the burner, a valve for controlling the fuel supply to the burner, a valve circuit comprising a solenoid for actuating the valve and a switch in series therewith, a fan for supplying air to the burner, a motor circuit comprising a motor for driving the fan and a switch in series therewith, means responsive to heat for closing the switch in the motor circuit, a heater circuit including electrical means for heating said last mentioned means, a thermostatic switch in series with the valve circuit and the heater circuit, and means actuated by air pressure induced by said fan for operating the switch in the valve circuit.

3. Combustion apparatus comprising a burner, means for supplying liquid fuel to the burner, a valve for controlling the fuel supply to the burner, a valve circuit comprising electrical means for actuating said valve and a switch in series therewith, a fan for supplying air to the burner, a motor circuit comprising a motor for driving the fan and a switch in series therewith, means responsive to heat for closing the switch in the motor circuit, a heater circuit comprising electrical heating means for heating the last mentioned means, a thermostatic switch in series with the heater circuit and the valve circuit, and means actuated by the air pressure induced by said fan for operating the switch in the valve circuit.

4. Combustion apparatus comprising a burner, means for supplying fuel to the burner, a valve for controlling the fuel supply to the burner, a valve circuit comprising electrical means for actuating said valve and a switch in series therewith, a fan for supplying air to the burner, a motor circuit comprising a motor for driving the fan and a switch in series therewith, a thermostatic switch in series with the valve circuit, means energized when the thermostatic switch is closed for closing the switch in the motor circuit and maintaining it closed for a predetermined time interval after the thermostatic switch is opened, and means actuated by the air pressure induced by the fan for operating the switch in the valve circuit.

BEN VALJEAN.